April 5, 1966  F. W. SIMPKINS  3,244,059
ELECTRICAL SIGNAL ACCENTUATION
Filed July 22, 1960  2 Sheets-Sheet 1
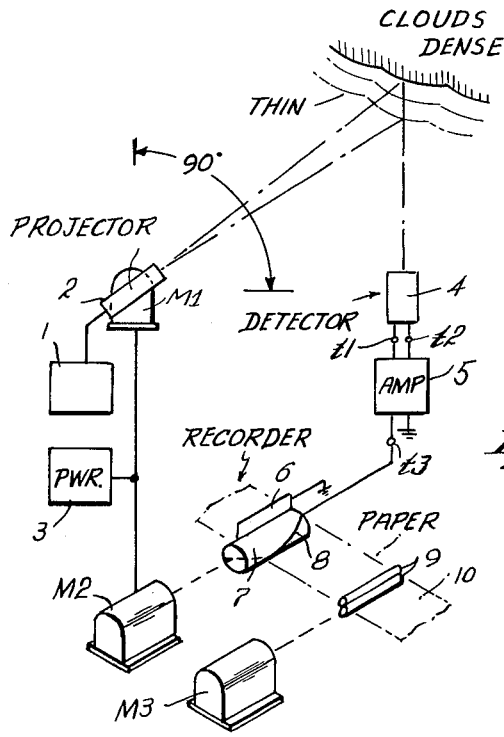
Fig. 1
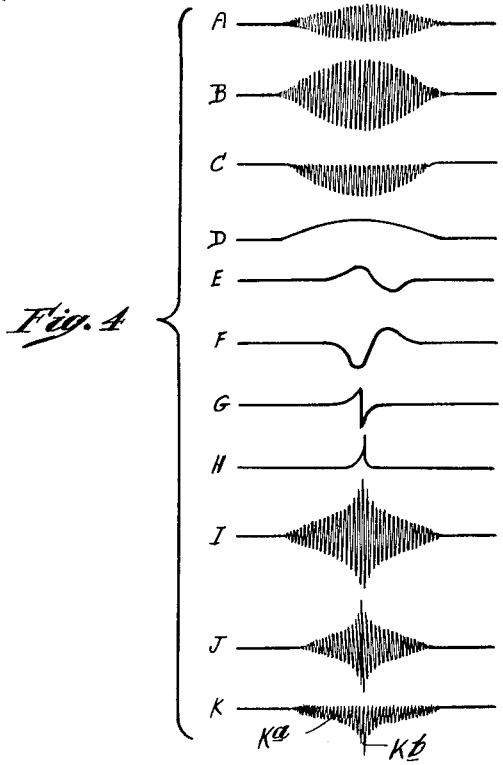
Fig. 3
Fig. 4
Fig. 5
Fig. 6
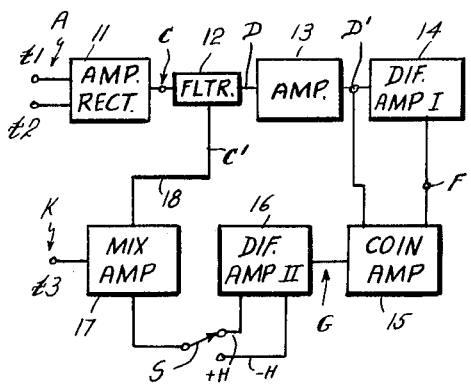
Fig. 2
Inventor
Frederick W. Simpkins
by Roberts, Cushman & Grover
ATT'YS United States Patent Office 3,244,059
Patented Apr. 5, 1966

3,244,059
ELECTRICAL SIGNAL ACCENTUATION
Frederick W. Simpkins, Hanover, Mass., assignor to Alden Research Foundation, Westboro, Mass., a business trust of Massachusetts
Filed July 22, 1960, Ser. No. 44,773
4 Claims. (Cl. 88—1)

This invention relates to an electrical circuit for amplifying an electrical signal in such a way as to accentuate a selected characteristic of the signal, particularly the maximum portion of a reflection signal such as is generated by a ceilometer.

In a typical ceilometer, for example, a modulated beam of light is projected skyward by a searchlight and light reflected from cloud formations is detected by a photoelectric cell, the amplitude of the reflected light and the photocell signal being proportional to the density of the cloud formation. Either the searchlight or photocell swings angularly so as to scan clouds at increasing altitudes, and the photocell signals are amplified and applied to a recorder whose scan is synchronized with the scan of the searchlight or photocell. As increasing altitudes are scanned the clouds become denser, and the reflected light and photocell signal increase in amplitude, until the densest cloud level is scanned. It is the densest cloud portion which is most significant meteorologically, but it is not the most easily distinguished, particularly after recording on paper. With many cloud formations the recording of reflections from lower, less dense levels tends to mask the significant cloud levels. The masking is due partly to a generally gradual increase in signal amplitude toward maximum and partly to random variations in the shapes and amplitudes of discrete reflections. Similar difficulties arise in recording reflected signals, such as underwater sound echoes, and relayed signals in pulse communication where it is desired to record an indistinct signal rising to a maximum.

Accordingly it is an object of the present invention to provide a circuit for amplifying such a signal so as to accentuate its maximum portion.

According to the invention electrical apparatus comprises an input channel for said signal, means for detecting the maximum portion of the signal, means for amplifying the detected portion, and means for mixing the amplified, detected portion and signal thereby to superimpose on the signal a distinctive amplitude variation coincident with said signal maximum. In some cases the maximum will be the highest amplitude of a direct current voltage, while in others it will be the highest amplitude of the envelope of a modulated signal.

For the purpose of illustration a typical embodiment of the invention is shown in the accompanying drawings in which:

FIG. 1 is a diagrammatic view of a ceilometer system;

FIG. 2 is a block diagram of a ceilometer amplifying circuit;

FIG. 3 is a typical ceilometer recording without accentuation;

FIG. 4 shows a series of voltage forms produced in the ceilometer amplifier;

FIGS. 5 and 6 are ceilometer recordings accentuated according to the invention.

Figure 7:
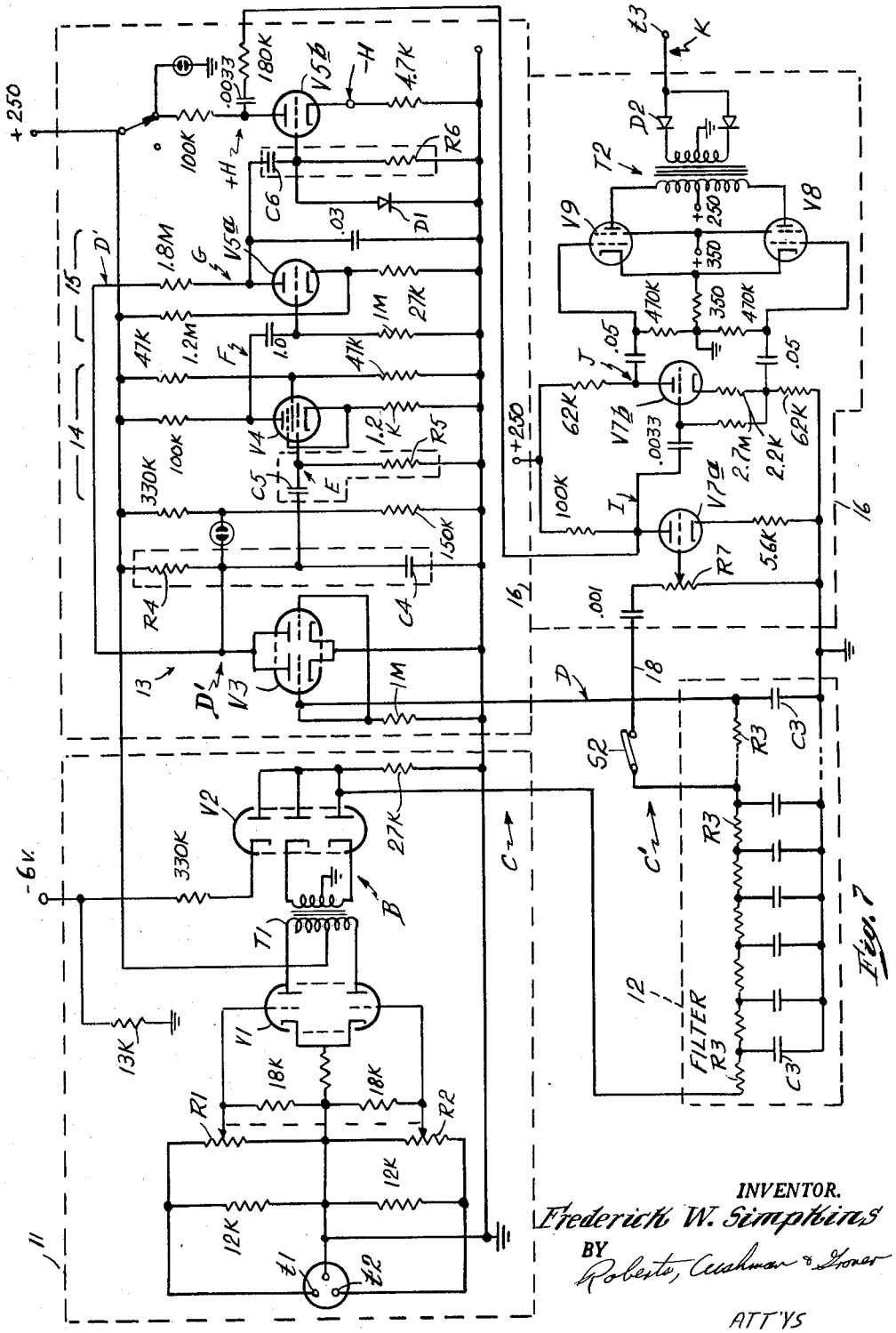
FIG. 7 is a schematic diagram of a ceilometer amplifier.

As shown in FIG. 1, a typical ceilometer comprises a power source 1 which supplies current to a projector 2 including two lamps capable of projecting light beams from opposite ends. A shutter, not shown, modulates the light beams of the projector at a tone frequency of 120 c.p.s. The projector 2, is rotated by a motor M1, connected to a power source 3, through a 360° arc so that the two beams successively sweep the clouds. In scanning this arc each lamp beam scans the atmosphere from zero to infinite altitude, and for practical purposes illuminate clouds at levels from zero to 30,000 feet or more. A photoelectric retector, spaced 500 feet from the projector for example, views light reflected from clouds above it. As the projector scans upwardly it will illuminate first thin portions of a cloud and then increasingly denser portions, until a maximum density is reached. Reflection from the cloud is dependent upon its density and accordingly, as the projector scans upwardly the reflected light becomes stronger and the photoelectric response of the cell increases as more dense cloud portions are illuminated. A somewhat idealized form of the photoelectric output voltage A is shown in FIG. 4.

The photocell output voltage is applied in opposite polarities to input terminals $t1$ and $t2$ of an amplifier circuit 5 which comprises the subject matter of the present invention. The amplifier circuit, which will be described in detail, produces at its output terminal $t3$ a voltage used by the ceilometer recorder.

The conventional, facsimile type recorder shown comprises a blade electrode 6 opposed to a drum 7 on which is mounted a helical electrode 8 which extends 180° around the drum. A strip of electrolytic recording paper 10 is drawn between the electrodes by feed rolls 9 driven by a motor M3. A motor M2, which is synchronized with the projector 2 by connection to the common power source 3, oscillates the drum 360° for each 180° sweep of projector 2. The point at which the helical electrode presses the paper against the blade electrode is thus caused to sweep transversely of the direction of paper feed. At any position of the projector and drum a cloud reflection will cause the photocell and amplifier to apply a voltage across the electrodes and through the paper at the transverse pressure point which corresponds to the altitude of the cloud. As the paper is fed, a continuous record of cloud height variations is marked along the paper.

As shown in FIG. 3 a typical cloud height recording appears as a series of parallel traces $a$ which are faint toward either edge of the paper 10$a$ and which appear denser over an indeterminate zone merging with the faint edges. Such a recording gives a vague indication of the thickness of the cloud formation, but makes difficult any interpretation of minimum altitude or an altitude which may be reported as significantly cloudy. The voltage form which is recorded in FIG. 3 is shown immediately below at A of FIG. 4.

FIG. 2 illustrates diagrammatically how the waveform A is transformed into a waveform which is extremely easy to interpret when recorded. Waveform A is a full wave voltage alternating at the frequency or tone of 120 c.p.s. at which the projector light is modulated. The alternated tone of voltage A is modulated from a minimum to a maximum and back to a minimum amplitude as first thin, then dense, then thin portions of a cloud are illuminated during each angular sweep of the projector. As can be seen in FIG. 4 the envelope of the voltage A rises gradually to a maximum and then drops gradually at a repetition rate which is the same as the rate at which the light projector 2 oscillates. By way of example, the repetition rate may be 6 cycles per minute, the envelope enduring for approximately one half second. Voltage A and an identical voltage are applied to the amplifier input terminals $t1$ and $t2$ 180° out of phase. The voltage is first amplified and detected by a conventional full wave amplifier and full wave rectifier channel 11 which produces at its output a voltage C whose envelope has the same maximum as the photocell voltage A. The modulated full wave rectified voltage C is applied to a filter or integrating network 12 which filters out the tone component of the modulated full wave rectified voltage C, leaving its envelope D.

The demodulated waveform D is amplified in an amplifier channel 13 producing an amplified, demodulated form D' which is applied to a differential amplifier stage 14. This stage includes an RC differentiating network and produces a short oscillation F having a sharp rise or drop coincident with the maximum amplitude of the envelope D'. This oscillation voltage F and the demodulated voltage D' are applied respectively to each of two inputs to a coincidence amplifier. Coincidence of the maximum amplitude of voltage D' and the sharp rise of oscillation F produce an oscillation G with an even sharper rise. The oscillation signal G is then applied to a second differentiator 16. The second differentiator produces single positive or negative pulse +H or −H coincident with the sharp rise of each oscillation G. The pulses appear in opposite polarity and in the same order of amplitude at two outputs from the second differential amplifier. Either polarity may be selected by a switch S and applied to a mixer amplifier channel 17. A coupling 18 also applies a modulated full wave rectified voltage C', which is substantially the same as voltage C, to the mixer. In the mixer the pulse H and modulated half wave are superimposed to produce a modulated signal having a sharp peak in its envelope. Depending on the order of amplification and rectification involved in the mixer amplifier channel 17, its output at terminal t3 will be a full wave or rectified modulated signal such as I, J or K. Preferably the rectified voltage K is applied to the recorder.

In FIG. 7 is shown a typical schematic circuit corresponding to the diagram of FIG. 2. In FIG. 7 typical values of the resistive and capacitative circuit elements are shown where the elements are not identified by reference characters. The conventional connections to a power supply, not shown, are identified by terminals labeled with appropriate voltages.

At the input terminals t1 and t2 of the amplifier and detector section 11 the 120 c.p.s. modulated cloud signals A are applied in opposite phase to a full wave amplifier V1, type 12AT7. Ganged potentiometers R1 and R2 are adjusted so that the outputs of the amplifier tube V1 are normally balanced in the primary of a coupling transformer T1. The full wave rectifier V2 produces a rectified signal C with 240 c.p.s. tone instead of the 120 c.p.s. tone or component.

The rectified signal C is applied to an integrating network or filter 12 comprising 29 resistance-capacitance pairs, R3, 22 kilohms, and C3, 0.0033 microfarad, of which the first six pairs and the last pair are shown. The 240 c.p.s. signal component is substantially suppressed in the signal D appearing at the last resistance of the filter, and the output signal of the filter is the envelope D. The integrator 12 is designed to produce maximum filtering with minimum delay of the envelope D.

The envelope signal D is applied to a dual triode amplifier V3, type 12AV7, which produces at its coupled anodes an amplified voltage D' like the envelope D but inverted in phase. The amplified envelope D' is modified by a short time constant network, R4, 39 kilohms, and C4, 0.05 microfad, which eliminates voltage fluctuations much shorter in duration than the period of the envelope D'. So modified the envelope D' is applied to a differentiator stage 14 and to a coincidence amplifier stage 15.

In the differentiator stage 14 the envelope D' is coupled to the grid of an amplifier V4 through a differentiating network R5, 470 kilohms, and C5, 0.01 microfarad. Because of the differentiating action the signal E at the grid of the differentiating stage amplifier, V4, the pentode section of a type 6AM8 tube, abruptly drops to and below zero as the envelope D' passes its peak amplitude. The abrupt drop appears as a sharp rise in the amplified signal F at the anode of the tube V4.

The differentiated signal F is applied by the differentiator amplifier V4 to the grid of a coincidence amplifier 15 including V5a, one half a type 12AU7 tube.

Simultaneously the envelope D' is supplied as the plate voltage for the coincidence amplifier V5a. When the envelope amplitude is low, amplifying action of the tube V5a is weak. But when the envelope amplitude reaches peak value coincident with the sharp rise in the differentiated signal F, the amplifier increases conduction quite sharply, generating a pulse G having negative and positive peaks coincident with the cloud envelope maximum. The positive peak of the pulse G is shorted to ground by a diode D1, type 1N97.

The advantage of applying plate voltage to the coincidence amplifier which varies proportionately with the incoming signal is this. A small amplitude but fast changing pulse will produce a large differentiated voltage whereas a much slower changing but larger amplitude signal will generate a smaller differentiated voltage.

In this case the signal we are concerned with is the slower changing, large amplitude signal which is generated by a cloud and not the short duration noise pulse. This slow changing, larger amplitude signal from the cloud is not attenuated to any great extent by the 29 section integrator, so it appears at the plate of the coincidence tube as a voltage which varies directly with the input. High intensity short duration signals, after passing through the integrator will be a low amplitude at G. However these short duration signals go through a differentiator and become of large amplitude, but because the plate voltage of the coincidence tube is low during a short duration signal as compared with a long signal, the output will be small. The effect is the output of the coincidence circuit will vary more directly with the amplitude of the incoming signal than with the rate of change. This is a highly advantageous result.

The negative peak of pulse G is somewhat further sharpened by a second differentiator network, R6, 1.2 megohms, and C6, 0.0033 microfarad. The sharpened pulse is applied to an amplifier V5b, one half a 12AU7 type tube, whose output is a short positive pulse H. This short pulse is applied to a mixer amplifier channel 16.

Reverting to the filter network 12, the sixth resistor R3 is also connected to the mixer amplifier channel 16. At the sixth resistor is a cloud signal C' substantially like the modulated 240 c.p.s. signal C. The modulated signal C', amplified by channel 16, is particularly suitable for recording purposes by virtue of its 240 c.p.s. tone.

The first stage of channel 16 is a mixer V7, one half a type 12AT7 tube. The modulated tone C' is applied to its control grid, while the short pulse H is coupled to its anode. What appears at the anode is a composite I in which the short pulse H is superimposed on the modulated tone signal, sharply peaking the tone at its maximum. The amplitude of the tone may be adjusted by a potentiometer R7, zero to 2.5 megohms. As indicated by the switch S in FIG. 2, instead of applying a positive pulse +H to the mixer amplifier channel, a corresponding negative pulse −H might be taken from the cathode of tube V5b. In such case the modulated tone would have a trough rather than a peak where its maximum was.

The composite signal, distinctively peaked at its maximum, is coupled by a phase inverter stage V7b, one half a type 12AT7 tube, to a power amplifier stage comprising two tubes V8 and V9, each type 6AQ5. The inverted composite signal J applied to the power amplifiers is similar to the signals I. A full wave signal like J is applied by the power amplifiers to an output transformer T2. In the secondary circuit of the transformer are two diodes D2 and D3, type M500, which pass a rectified signal K to the output terminal t3. The signal K contains cloud density portions Ka and the superimposed peak Kb.

The output signal K, negative in polarity, is applied to the helix 8, for example, of the recorder described earlier. As shown in FIG. 5 the resulting recording 10b contains the normal traces *a* showing variations in cloud density with altitude, and in addition distinctive dark marks *b*. The dark marks correspond with the peak K*b* superimposed on the modulated tone K*a* of the output signal K, and thus represent the densest cloud portion, usually considered the reportable cloud altitude. A comparison of FIGS. 3 and 5 shows clearly how the interpretation of the recording and selection of the reportable cloud height is facilitated by provision of the dark marks.

In situations where background noise obscures the normal cloud tone *a*, the dark maximum signal *b* may be recorded alone by opening switch S2 (FIG. 7) coupling the filter 12 to the mixer amplifier 16.

Distinctive recordings other than those containing dark maximum marks may be made. For example if the switch S of FIG. 2 selects a negative pulse —H for superimposition on the modulated tone, the resultant signal will comprise the modulated tone interrupted by a trough instead of a peak. Such a resultant signal is recorded as shown as shown in FIG. 6, wherein the recording 10c includes the normal traces *a* interrupted by a light band *c* at the maximum cloud density altitude.

It will be understood that the distinctive modification of the normal cloud signal may be achieved in ways other than that here described for the purpose of illustration and that this invention includes all modifications and equivalents which fall within the scope of the appended claims.

I claim:

1. In a ceilometer including a light beam projector and a photoelectric detector for scanning cloud formations, said detector producing an electrical signal rising to a maximum as cloud portions of increasing density are scanned, an electronic circuit for applying said signal to a recorder, said circuit comprising an input channel for the signal, means for detecting the maximum amplitude portion of said signal, means for amplifying the detected portion independently of the signal, and means for transmitting the entire signal in substantially original form and for mixing the amplified detected portion and transmitted signal thereby to superimpose on the signal in substantially its original form a distinctive amplitude portion coincident with said maximum portion, whereby the recorded signal comprises a distinctive trace of the densest cloud portions as well as of the cloud formations scanned.

2. In a ceilometer including a light beam projector and a photoelectric detector for scanning cloud formations, said detector producing an electrical signal rising to a maximum amplitude as cloud portions of increasing density are scanned, an electronic circuit for applying said signal to a recorder, said circuit comprising an input channel for the signal, first circuit means connected thereto for differentiating the signal and producing an oscillation shorter in duration than said interval and having a sharp rise coincident with said signal maximum, second circuit means for differentiating said oscillation to produce a short pulse coincident with said sharp rise and said maximum, and a signal mixer connected to said input channel and second circuit means for mixing said signal and pulse, thereby to superimpose on the signal a distinctive amplitude portion coincident with said maximum portion, whereby the recorded signal comprises a distinctive trace of the densest cloud portions as well as of the cloud formations scanned.

3. In a ceilometer including a modulated light beam projector, a photoelectric detector of light reflected from cloud, drive means causing one of said projector and detector to scan cloud formations at different altitudes whereby said detector produces a modulated electric signal rising during an interval to a maximum amplitude as cloud portions of increasing density are detected, and a recorder synchronized with said drive means, an electronic circuit adapted to be connected between said detector and recorder comprising an input channel for amplifying said modulated signal, a detector converting the modulated signal to a direct current voltage rising to a maximum during the same interval, a first differentiator stage including a first time constant network converting said direct current signal to a single oscillation having a sharp rise coincident with said maximum, a nonlinear amplifier including input means coupled to said first differentiator stage and current carrying means coupled to said detector such that said amplifier amplifies said oscillation substantially only on coincidence of said sharp rise and said direct current maximum, a second differentiator stage including a time constant network converting said amplified oscillation to a short pulse coincident with said sharp rise and said maximum, and a signal mixer coupled to said input channel and second differentiator for mixing said modulated signal and short pulse with said short pulse superimposed on the maximum of the signal, said mixer being adapted to be coupled to said recorder to mark a record showing the change of cloud density with altitude in which a record of maximum cloud density is easily distinguished.

4. Electronic apparatus for accentuating an electrical signal varying to and from a maximum amplitude during an interval, which comprises an input channel for said signal, first circuit means connected thereto for differentiating the signal and producing an oscillation shorter in duration than said interval and having a sharp rise coincident with said signal maximum, second circuit means for differentiating said oscillation to produce a short unipolar pulse coincident with said sharp rise and said maximum, a signal mixer connected to said input channel and second circuit means for mixing said signal and pulse, thereby to superimpose on said signal a distinctive amplitude variation coincident with said signal maximum, and means to apply to a recorder the signal accentuated at its maximum by said amplified detected portion.

References Cited by the Examiner

UNITED STATES PATENTS

| | | | |
|---|---|---|---|
| 2,365,580 | 12/1944 | Murcek. | |
| 2,448,718 | 9/1948 | Koulicorvitch | 328—150 |
| 2,481,034 | 9/1949 | Neufeld | 88—10 |
| 2,659,823 | 11/1953 | Vossberg | 88—14 |
| 2,868,059 | 1/1959 | Summerhayes | 88—14 |
| 2,918,581 | 12/1959 | Willey et al. | 88—1 |

FOREIGN PATENTS 793,747   4/1958   Great Britain.

OTHER REFERENCES

"Computer Analyses Cloud-Height Data," Electronics, vol. 32; No. 42, October 16, 1959, pages 88–91.

"How High is the Sky," ISA Journal, vol. 7, Issue No. 3, page 73, March 1960.

M.I.T. Staff, "Applied Electronics," John Wiley and Sons, Inc., 1943, Chapter XII (Modulation and Demodulation or Detection), pages 624–625 (in particular pages 632–638 and FIG. 4).

JEWELL H. PEDERSEN, *Primary Examiner.*

EMIL ANDERSON, *Examiner.*